United States Patent [19]
Coady

[11] 4,130,946
[45] Dec. 26, 1978

[54] EDUCATIONAL DEVICE FOR MOTIVATING, AND FOR DEVELOPING SCRIBING AND READING SKILLS IN, THE HANDICAPPED

[76] Inventor: William J. Coady, 1732 W. Jackson St., Springfield, Ill. 62704

[21] Appl. No.: 814,424

[22] Filed: Jul. 11, 1977

Related U.S. Application Data

[63] Continuation-in-part of Ser. No. 619,780, Oct. 6, 1975, abandoned, which is a continuation-in-part of Ser. No. 495,919, Aug. 8, 1974, abandoned.

[51] Int. Cl.² ............................................. G09B 11/04
[52] U.S. Cl. ................................................ 35/37
[58] Field of Search ................ 35/22 R, 22 A, 26, 36, 35/37, 38, 35 J

[56] References Cited

U.S. PATENT DOCUMENTS

| | | | |
|---|---|---|---|
| 1,103,369 | 7/1914 | Montessori | 35/38 X |
| 1,245,475 | 11/1917 | Lindheim | 35/38 X |
| 2,068,497 | 1/1937 | Lorber | 35/37 |
| 2,277,329 | 3/1942 | Kimbrough | 35/37 |
| 2,456,632 | 12/1948 | Greenberg | 35/37 |
| 2,682,118 | 6/1954 | Larsen | 35/37 X |
| 3,314,171 | 4/1967 | Bethune | 35/37 |
| 3,537,202 | 11/1970 | Braun et al. | 35/35 J X |
| 3,731,402 | 5/1973 | Paul | 35/37 |

FOREIGN PATENT DOCUMENTS 993965 6/1965 United Kingdom ....................... 35/37

*Primary Examiner*—Richard J. Apley
*Attorney, Agent, or Firm*—Ralph F. Staubly

[57] ABSTRACT

An educational device having groups of cursively connected symbols forming words and fabricated by die-cutting-out areas of semi-rigid tough plastic sheets to form guides for scribing implements. The groups of cursively connected symbols, by forming words, meaningfully motivate mentally and/or physically handicapped persons to learn to write and read. Desirably, the cutout symbol portions are retained for use with the sheets, either unattached, or preferably fixed to the sheets above the cut-out areas, for re-inforcing learning, visually, or tactually especially for sight-deficient students.

6 Claims, 3 Drawing Figures

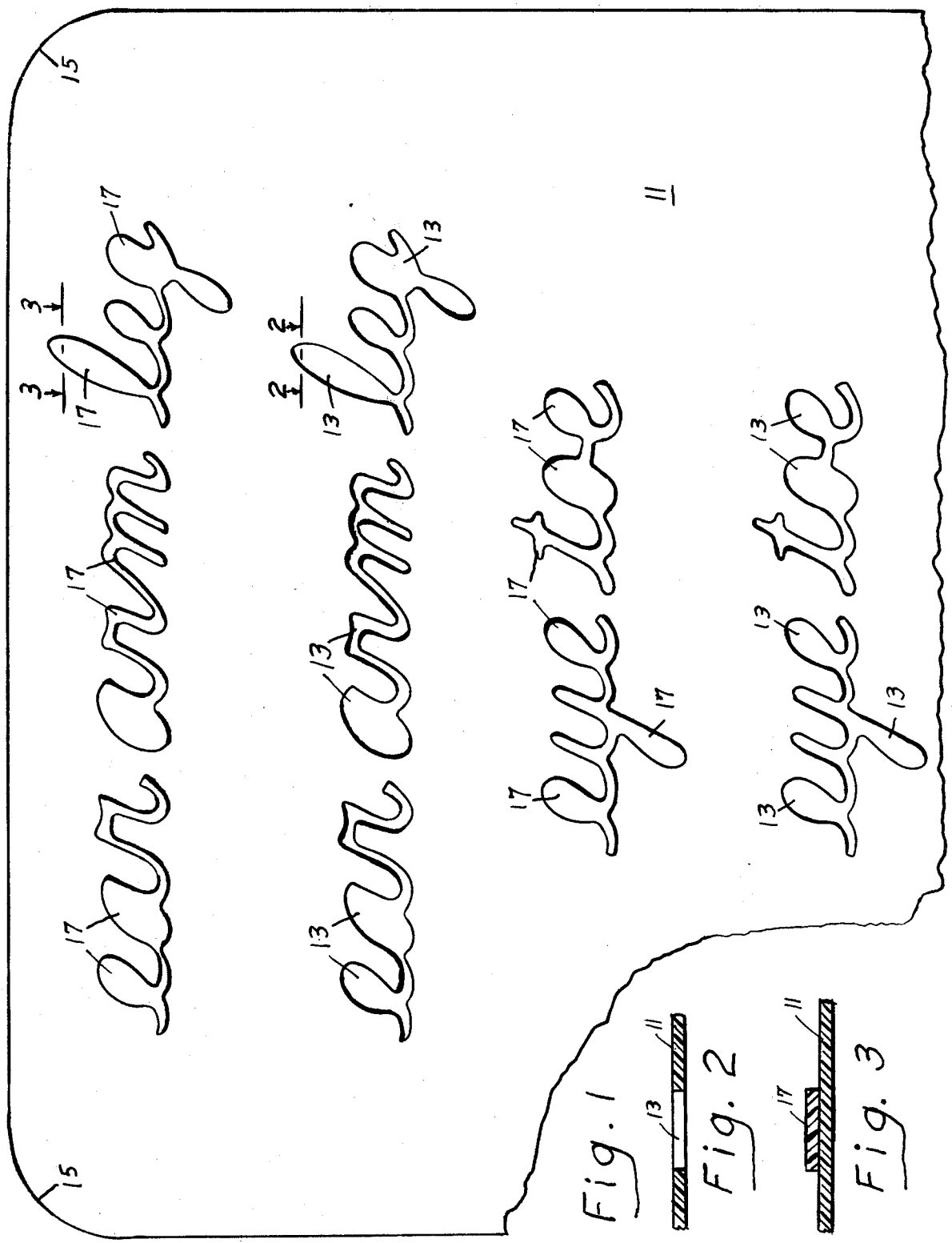

EDUCATIONAL DEVICE FOR MOTIVATING, AND FOR DEVELOPING SCRIBING AND READING SKILLS IN, THE HANDICAPPED

BACKGROUND AND OBJECTS OF THE INVENTION

This application is a continuation-in-part of abandoned application Ser. No. 619,780, filed Oct. 6, 1975 and identically entitled, which was a continuation-in-part of Ser. No. 495,919, entitled "SCRIPT AND MATH GUIDE", filed Aug. 8, 1974, now abandoned.

Prior-art stencil-like guides for training young or handicapped persons to write are known, for examples U.S. patents to Kimbrough No. 2,277,329 and Paul No. 3,731,402. But the prior-art guides do not motivate learning by connecting otherwise meaningless symbols into meaningful groups, namely words, to stimulate the student's interest through his and/or his teacher's recognition of the practical value of using such training devices.

It is accordingly the principal object of this invention to provide an educational device which strengthens learning motivation by grouping the symbols of a stencil-like training guide in arrangements possessing conceptual (verbal) significance. It is another object to provide such a device with raised symbols, matching those of the stencil-like part, to improve the learning process through additional visual and/or tactile reinforcement. Other objects and advantages of the invention will become apparent as the following detailed description proceeds.

BRIEF DESCRIPTION OF THE DRAWINGS

FIG. 1 is a plan view of a preferred embodiment of the invention.

FIG. 2 is an enlarged partial elevational view, in section taken on the line 2—2 of FIG. 1.

FIG. 3 is an enlarged partial elevational view, in section taken on the line 3—3 of FIG. 1.

DETAILED DESCRIPTION OF THE DISCLOSURE

With reference now to the drawings, the numeral 11 designates a sheet of tough semi-rigid plastic material of a thickness of the order of from a half millimeter to several millimeters, and sufficiently flexible to be, in normal use, bendable without creasing or breaking. Alternatively, the sheet 11 can be made of a hard cardboard or plasticized bookbinding material. Desirably, the upper surface (or both surfaces) of the sheet 11 should be smooth, waterproof, stain-resistant and easily cleanable.

The guide portion of the sheet 11 has cut-out areas 13 adapted to guide the tips of hand-held scribing implements over a sheet of paper underlying the sheet 11. The corners of the sheet 11 are rounded at 15 for safety against personal injury if the sheet 11 should be thrown or mishandled by a distraught person. Desirably, the face of the sheet 11 is of a psychologically attractive coloration, but is sufficiently dark for lighting contrast with the coloration of the underlying sheet of paper.

Another learning-reinforcing feature is the provision of matching groups of raised symbols 17 fixed to the upper surface of the sheet 11 directly above the cut-out areas and arranged parallel thereto, for visual and/or tactile sensing by right- or left-handed students. Alternatively, the matching groups of raised symbols can be left unattached if preferred.

The raised symbols can be embossed in the sheet 11, but for economical fabrication are preferably the symbol pieces cut-out from the areas 13, and if attached, cemented or thermoplastically welded to the sheet 11.

Having thus described my invention, I claim:

1. An educational device, especially useful for physically and/or mentally handicapped persons, comprising: a semi-rigid lamina having at least one group of interconnected cut-out areas of conventional cursive symbol configurations, the margins of said areas being adapted to serve as guides for a manually held scribing implement, and said at least one group of areas having, through symbol combination, learning-stimulating verbal conceptual significance; at least one group of raised symbols, matching said cut-out areas and usable with said lamina, whereby visual sensing, and/or tactile sensing by a second hand, can be effected while a first hand is being guided by said scribing implement and the margins of said cut-out areas, said at least one group of raised symbols being fixedly positioned directly above and parallel to said at least one group of cut-out areas for convenient sensing by either right- or left-handed persons.

2. An educational device according to claim 1, at least the face of said lamina having a smooth, stain-resistant, waterproof and easily cleanable surface.

3. An educational device according to claim 1, said at least one group of raised symbols being portions of said lamina die-cut therefrom in defining said at least one group of cut-out areas.

4. An educational device according to claim 1, said lamina having rounded corners for safety and being formed of tough semi-rigid flexible plastic material.

5. An educational device according to claim 4, said plastic lamina being of a thickness of the order of one millimeter.

6. An educational device according to claim 1, at least the face of said lamina being of a moderately dark coloration.

* * * * *